United States Patent
Komlos et al.

(10) Patent No.: US 7,690,553 B2
(45) Date of Patent: Apr. 6, 2010

(54) METHODS AND SYSTEMS FOR MITIGATING RESIDUAL TENSILE STRESSES

(75) Inventors: William A. Komlos, Salt Lake City, UT (US); Lawrence D. Reaveley, Holladay, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 11/916,971

(22) PCT Filed: Jun. 7, 2006

(86) PCT No.: PCT/US2006/022234

§ 371 (c)(1),
(2), (4) Date: May 22, 2008

(87) PCT Pub. No.: WO2006/133343

PCT Pub. Date: Dec. 14, 2006

(65) Prior Publication Data

US 2008/0237309 A1    Oct. 2, 2008

Related U.S. Application Data

(60) Provisional application No. 60/688,527, filed on Jun. 7, 2005.

(51) Int. Cl.
*B23K 1/20* (2006.01)
(52) U.S. Cl. .................................... 228/173.1; 228/200
(58) Field of Classification Search .................. None
See application file for complete search history.

(56) References Cited

U.S. PATENT DOCUMENTS

| | | | | |
|---|---|---|---|---|
| 2,429,320 | A | * | 10/1947 | Kennedy ..................... 148/517 |
| 3,661,655 | A | | 5/1972 | Hrusovsky |
| 4,243,169 | A | * | 1/1981 | Sara ........................... 228/175 |
| 4,348,131 | A | | 9/1982 | Shimanuki et al. |
| 4,715,189 | A | | 12/1987 | Hohenwarter |
| 4,986,077 | A | | 1/1991 | Saho et al. |
| 5,688,419 | A | | 11/1997 | Offer |
| 5,787,714 | A | | 8/1998 | Ohkura et al. |
| 6,191,527 | B1 | | 2/2001 | Kreider, III |
| 6,223,974 | B1 | | 5/2001 | Unde |
| 6,290,905 | B1 | | 9/2001 | Watanabe et al. |
| 6,333,484 | B1 | | 12/2001 | Foster et al. |
| 6,896,171 | B2 | | 5/2005 | Den Boer et al. |
| 2004/0047757 | A1 | * | 3/2004 | Takayama ................... 420/107 |

\* cited by examiner

*Primary Examiner*—Kiley Stoner
(74) *Attorney, Agent, or Firm*—Thorpe North & Western LLP

(57) ABSTRACT

Residual tensile stresses can be mitigated through methods and systems provided by the present invention. Such a method can include securing a metal member (10) to a substrate and at least partially surrounding a portion of the metal member (10) with a cooling fluid (18). As a result, the cooled portion of the metal member (10) contracts a predetermined amount. Once cooled, the metal member may be fixed, preferably welded, to another metal member in a constrained relationship. As the portion of the metal member is returned to its original temperature, expansion of the metal member acts to mitigate residual tensile stresses in the metal assembly. Tensile stress in restrained members, cambering, and structural deformation can be readily controlled in an assembled structure.

10 Claims, 7 Drawing Sheets

METHODS AND SYSTEMS FOR MITIGATING RESIDUAL TENSILE STRESSES

RELATED APPLICATIONS

This application claims priority to U.S. Provisional Application No. 60/688,527, filed Jun. 7, 2005 which is incorporated herein by reference.

FIELD OF THE INVENTION

The present invention relates generally to methods and systems for reducing or mitigating residual tensile stresses associated with metal assemblies. Accordingly, the present invention involves the fields of structural engineering, mechanical engineering, chemistry, metallurgy, and materials science.

BACKGROUND OF THE INVENTION

Metal assemblies have been greatly used during the past few centuries. As technology advances, the use of superior metals, alloys, and other construction materials, have allowed for the creation of sophisticated buildings and machinery. Residual stress in individual metal members of such metal assemblies directly affects their stability, strength, and durability.

For example, welding is thought to be one of the most important technological processes used in various industrial fields such as industrial engineering, aerospace industry, automobile industry, shipbuilding industry, among many others. Generally, welding involves the joining of two fusible materials, generally with an intermediate or filler material through the application of heat. There are many known processes for welding metallic objects such as shielded metal arc welding (SMAW), gas-metal arc welding (GMAW), flux-cored arc welding (FCAW), and submerged arc welding (SAW), to name a few.

During a typical welding process, the joined metal work pieces inherently encounter effects of shrinkage, phase transformations, intensification of corrosion, solidification cracking, residual joint restraint stresses, and the like. Residual weld stresses arise in the weld zone of the work piece and can possess the characteristics of premature joint or weld failure. The residual tensile stresses arising after welding exert a considerable influence on the ductility and strength characteristics of welded work pieces and enhancing or restoring these characteristics may permit the avoidance of welded joint failure. It is a usual practice to alleviate the stress through a stress relieving, thermal or vibratory process. However, common stress relieving processes require increased temperatures and subjecting the weldments to substantially high temperatures for extended periods of time. Other processes shake or peen the weldment after joining. These processes can be expensive and may not be practical for most welding situations.

Accordingly, it is believed that there are other methods where residual stress may be relieved from welded joints and other joining of structures. However, to date, a practical and cost efficient method continues to be sought which can reduce the effects of residual stress on metal assemblies.

SUMMARY OF THE INVENTION

The present invention encompasses a method of mitigating residual tensile stresses in metal assembly members. The method may include securing a first surface of a first metal member to a substrate. Then a portion of the first metal member can be at least partially surrounded with a cooling fluid capable of sufficiently cooling a predetermined portion of the first metal member. Cooling in this manner can result in shrinkage of the cooled portion to a predetermined length. A second surface of the first metal member can then be fixed to a second structural member. In a preferred embodiment, the first metal member can be fixed to a second metal member through welding. As the cooled portion warms, the portion expands to introduce a compressive stress in the first metal member which acts to at least partially mitigate residual stresses of the metal assembly.

In one embodiment of the present invention, a system for mitigating residual tensile stresses is provided. The system may include a fluid containment vessel having an interior volume capable of retaining a cooling fluid therein. The fluid containment vessel can also be designed to enclose at least a portion of a first metal member. Further, a cooling source may be included which contains a cooling fluid, such as liquid nitrogen, and may be operatively connected to the fluid containment vessel. In addition, an optional welding apparatus capable of joining the first metal member to a second metal member may be provided according to this embodiment of the present invention. Typically, the substrate and second metal members can be fixed in position relative to one another such that the first metal member is secured and welded in a highly restrained joint. Alternatively, the substrate and second members can be slightly flexible such that during welding one or both can be pulled out of plane by weld stresses. Thus, the present invention can be used to return the substrate and second members to their originally designed orientations.

In another embodiment, portions of the first metal member can be thermally contracted to camber or bend the metal member in order to introduce a prestress to mitigate future assembly stresses (such as pushing members back into plane after welding) or applied load stresses in less restrained members. In some cases, the performance of the resulting connection of the first metal member to the assembly can be improved. For example, service loads can be resisted by the induced compressive spring in the first metal member rather than by yielding of concave surfaces of a metal member previously cambered by conventional heat or cold bending the cambered metal member. The induced compressive stress can be achieved in the accordance with the methods of the present invention.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
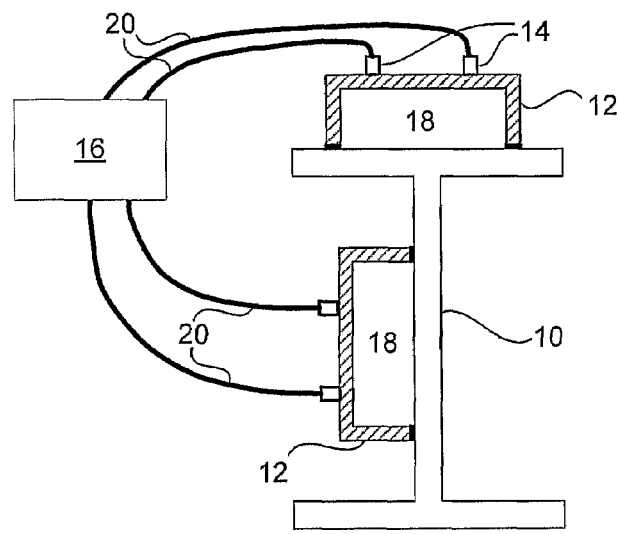
FIG. 1 is a cross-sectional view of an I-beam and individual fluid containment vessels in accordance with an embodiment of the present invention.

The above figures are not necessarily drawn to scale and are provided primarily to facilitate a clearer understanding of the following detailed description of aspects of the invention. It will nevertheless be understood that no limitation of the scope of the invention is thereby intended.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features, process steps, and materials illustrated herein, and additional applications of the principles of the inventions as illustrated herein, which would occur to one skilled in the relevant art and having possession of this disclosure, are to be considered within the scope of the invention. It should also be understood that terminology employed herein is used for the purpose of describing particular embodiments only and is not intended to be limiting.

A. DEFINITIONS

In describing and claiming the present invention, the following terminology will be used.

The singular forms "a," "an," and "the" include plural referents unless the context clearly dictates otherwise. Thus, for example, reference to "a substrate" includes reference to one or more of such substrates, and reference to "an alloy" includes reference to one or more of such alloys.

As used herein, the term "weld" or "welding" refers to a technique for joining or fusing metallic materials through the use of heat in which actual fusion of the materials being joined occurs at the weld joint. The welded materials may be similar or dissimilar depending on the welding procedure employed. In addition, an intermediate or metallic filler material may be used to facilitate the joining process. A variety of welding processes may be incorporated in the present invention such as, but not limited to, SMAW, GMAW, FCAW, and SAW. Further, other arc welding processes such as gas tungsten and plasma arc welding can be used.

As used herein, "ambient temperature" refers to the temperature of the working environment under which the method is performed. Typically, ambient temperature can be substantially room temperature, e.g., 20-25° C. However, in some cases, ambient temperature can be elevated for a particular application. For example, in some manufacturing environments, metal members can be assembled at elevated temperatures, e.g., greater than about 50° C., or at substantially cooled temperatures, less than about 0° C. Additionally, an area immediately surrounding the welded joint can be preheated, e.g. approximately 100° C. to about 205° C., to improve the resulting weld.

As used herein, "mitigation or reduction of tensile stresses" includes any reduction of tensile stress in a member and/or associated structure. For example, reduction of tensile stress in a weldment can be sufficient to introduce a negative tensile stress, i.e. compressive stress. Alternatively, the configuration and degree of thermal shrinking can be controlled to provide merely a reduction of positive tensile stress or return members to their designed orientation subsequent to welding. Further, a pre-cambered member produced by localized or preferential cooling can be constrained between to members resulting in a reduction of tensile stresses in the cambered member.

The term, "substantial" refers to a quantity or amount of a material, or a specific characteristic thereof, that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

The term "surround" or "surrounding" refers to substantially enclosing, encompassing or extending around an object or a desired portion of an object. For example, in the present invention, a cooling fluid may partially surround or completely surround a metal member depending on the shape of the enclosure. In context of the present invention, the cooling fluid can surround the desired portion of the object sufficient to achieve a predetermined temperature and associated change in dimensions.

The term "secure" or "securing" refers to fastening one object to another in a substantially fixed relationship, such that the object is unlikely to come loose or move under anticipated stresses. For example, in reference to the present invention, a metal member or work piece may be firmly fastened to a substrate thereby eliminating movement. The metal member may be fastened to a substrate through any suitable means such as, but not limited to, welding, fusing, bolting, riveting, melting, gluing, etc.

The term "vessel" or "containment vessel" refers to a device which defines a substantially hollow space for retaining any substance such as a fluid in contact with a desired member. The vessel as used herein may be of any shape or size which may partially surround a metal member and contain a cooling fluid. The vessel may also contain a cooling fluid as part of a closed system. A closed system can contain a separate cooling fluid reservoir connected to a containment vessel that can be in contact with a desired member.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 to about 5" should be interpreted to include not only the explicitly recited values of about 1 to about 5, but also include individual values and sub-ranges within the indicated range. Thus, included in this numerical range are individual values such as 1.5, 2, 3.5, and 4 and sub-ranges such as from 1-3, from 2-4, and from 3-5, etc. This same principle applies to ranges reciting only one numerical value and should apply regardless of the breadth of the range or the characteristics being described.

The Invention

The present invention encompasses a method of mitigating residual tensile stresses in members attached between two points or other members. As recited in the background section, residual stress is inherent in most metal assemblies. For example, a welded article such as a metal work piece experiences different types of residual thermal stresses and strains as a result of expansion and contraction of the material as a function of temperature variation. The physical dimensions of most metallic materials expand when heated and contract when cooled. The amount of linear expansion for a given material can be calculated by a change in temperature coupled with an initial length and the thermal expansion coefficient. The thermal expansion coefficient is generally defined as the material's fractional increase in length per unit rise in temperature. As previously mentioned the presence of residual stresses in weldments can adversely and prematurely cause breakage or failure of a work piece. Therefore, one embodiment of the present invention provides a method and system which is capable of reducing the residual stress found in welded joints. The present invention focuses on reducing residual tensile stresses in metal assemblies by compensating for the resultant stress through thermally compressing or shrinking a section or portion of a metal work piece prior to fixation of the metal member.

Typically, the method of the present invention can include securing or constraining two surfaces of a metal member to two substrates. The metal member can be secured to at least one of the substrates by welding, bolting, or any other means of securing the member in a fixed position. In addition, at least one substrate can be substantially fixed in relation to the other substrate. A cooling fluid such as liquid nitrogen can at least partially surround a portion of the metal member to sufficiently cool and shrink a portion of the metal member to achieve a desired change in linear dimension. The cooled portion may be enclosed by a fluid containment vessel and be located between the two surfaces such that a compressive stress is introduced once the metal member returns to ambient temperature. It is worthy to note that the resulting stress of the metal member need not be a compressive stress, rather, the contracted metal member introduces a compressive stress to at least partially mitigate residual tensile stresses, such that the resultant tensile stress of the metal member is less than if the metal member had not been secured by the methods of the present invention. Preferably, the resulting stress of the metal member and associated joints can be a compressive stress.

In one embodiment, the securing step may be welding a first metal member to a second substrate such as a second metal member together to form a weld joint. Once welded, the cooling fluid may be removed from the portion of the metal member. As the temperature is raised, the compressed portion of the metal member expands and can exert compressive stresses on the weld joint. The fixed relationship of the two substrates acts as a restraint at the welded surfaces to resist displacement as the cooled portion of the weldment warms to ambient temperatures and introduces a compressive stress. The two substrates need not be rigidly fixed, although each member should be sufficiently fixed with respect to the other such that a reduction of tensile stress, and preferably a compressive stress results in the final structure. The compressive stress in the metal member should typically increase as a result of this shorter, ambient condition. Shrinking the metal members before welding provides the source of compressive stress used to mitigate the residual tensile stress from welding. This method can reinforce weld joint ductility expected of the design and optional intermediate and filler metals.

As previously mentioned, the method can include the initial step of securing a first surface of a first metal member to a substrate. The substrate may be any rigid member having a surface that is capable of bearing the load of the metal member. In one aspect, the substrate may be a brick or concrete wall. However, preferably, the substrate may be a metallic member capable of being secured to the first metal member.

In yet another aspect, the substrate may be a metallic member having dissimilar properties from the first metal member. Furthermore, the first surface of the first metal member may be secured to the substrate through any suitable method, such as, but not limited to, welding, bolting, riveting, melting, fusing, gluing, etc. The choice of the securing method can be dictated by the type of substrate employed and the application of use of the metal member. For example, in one aspect, the first surface of the first metal member may be secured to a concrete substrate through a bolting means and the second surface welded to a second metal member. Generally, the second metal member can be substantially fixed in position, relative to the substrate such that the metal member is secured in a constrained configuration. In another aspect, the first surface of the first metallic member may be secured through welding to a metal substrate. Securing the first metal member to a substrate may be performed prior to cooling a portion of the first metal member.

Almost any metal member can be secured in accordance with the present invention. Suitable metal members can range in characteristics such as size, shape, and composition which may vary from member to member depending on the particular structure being formed. The first metal member of the present invention may be comprised of any metallic material that is capable of linear contraction. Materials that may be suitable for linear contraction can include, but are not limited to, carbon steel, stainless steel, chrome-molybdenum steels, copper, titanium, aluminum, tin, iron, and alloys or composites thereof. In one aspect of the present invention composition of the first metal member can be a carbon steel composition. In yet another aspect the metal member may be comprised of an aluminum metallic material doped with additives, such as copper, manganese, etc., to form an alloy. In yet another aspect, the material can include concrete, polymer composites, carbon fiber composites, or combinations thereof.

Any variety of metallic shapes may be employed such as an I-beam, a T-beam, an S-beam, a solid or rod, and pipe, to name a few common shapes. In one aspect, the metallic member can be a carbon steel I-beam. In another aspect the metallic member may be an aluminum pipe. As noted above, the first metal member may be comprised of similar metallic materials as the second metal member or may be comprised of a dissimilar metallic material. Additionally, the metallic shapes may also include bent metal plate or other irregular shapes.

In one embodiment, a portion of the metal member can be cooled prior to welding via temperature reduction using a cooling source. The cooling source employed by the present invention may be any device or media which can be used to reduce the temperature of a metal member and can be operatively coupled to a fluid containment vessel as described herein. In one aspect, the cooling source may be a compressed stainless-steel tank which is capable of containing a cooling fluid. In another aspect, the device may be a polystyrene container. Typically, the cooling source can contain a cooling fluid.

Any suitable cooling media or fluid, whether solid, gas or liquid which can reduce the temperature of a metal member can be utilized in the present invention. For example, liquid nitrogen, liquid helium, liquid argon, liquid oxygen, solid or liquid carbon dioxide (dry ice), and combinations thereof may be used to cool a metal member of the present invention. Depending on the temperatures under which the method is performed, other fluids such as refrigerants, water, and other materials capable of reducing temperature in a structural member can also be suitable to achieve a desired temperature difference. In one currently preferred aspect, liquid nitrogen may be used to cool a portion of a metal member in accordance with the present invention. Liquid nitrogen can be desirable because it is readily available, inexpensive, and can effectively reduce temperatures of a metal member sufficient to contract or shrink a portion of the metal member thereby enabling compensation for residual linear stress generated by a welding process. For example, surrounding or at least partially surrounding a metal member with liquid nitrogen may reduce the temperature of a metal member at an ambient temperature by about 190° C. This reduction in temperature can typically be sufficient to mitigate residual stresses due to welding. Thus, stresses within the structural members can be reduced. The amount of cooling fluid required and the duration for which the metal member is subjected to the cooling fluid may vary with each application, and can depend on such factors as composition of the metal member, dimensions of the metal member, temperature ranges, and the like.

A variety of systems and devices can be suitable for cooling in accordance with the present invention. A fluid containment vessel can have an interior volume capable of retaining a cooling fluid therein. The fluid containment vessel can be configured to enclose at least a portion of a first metal member for cooling thereof. A cooling source containing the cooling fluid can be operatively connected to the fluid containment vessel FIG. 1 shows a cooling system in accordance with one embodiment of the present invention having containment vessels which are surface contact coolers. Contact coolers can be open-sided shells which enclose a defined volume upon sealing the open side against a surface to be cooled. Sealing can be accomplished using any suitable low-temperature foam, sealant or gasket material. The open-sided shells can be any suitable shape such as, but not limited to, rectangular, square, circular, or the like. For example, such contact coolers can be used in cooling a metal member such as an I-beam. Fluid containment vessels 12 can be placed against one or more surfaces of an I-beam 10 to provide a linear contraction in accordance with the present invention. The fluid containment vessels can have inlet and outlet valves 14 connected to a cooling source 16 through return and supply lines 20. The fluid containment vessels can be configured in a rectangular shape with one open side to cover an appropriate amount of surface area of the I-beam sufficient to contract the I-beam in accordance with the present invention. The fluid containment vessels can contain a cooling fluid 18 that can be in direct contact with the I-beam. Alternatively, the fluid containment vessels can be entirely enclosed such that an external cooling surface of the fluid containment vessel is contacted with a portion of the member. The cooling surface can have a sufficiently high thermal conductivity to allow cooling of the desired portion of the I-beam. After sufficient cooling, the I-beam can be secured between two substrates. The substrates can be fixed in relation to one another such that upon expansion of the cooled portion of the I-beam the residual tensile stress of the metal assembly is at least partially mitigated.

Additionally, the cooling source can be operatively coupled to a fluid containment vessel. Typically, the fluid containment vessel may contain an inlet and an outlet port for receiving and expelling the cooling fluid from the cooling source. Generally, the inlet and outlet port may be in fluid communication with an interior volume of the fluid containment vessel to provide a direct passageway to the portion of the metal member which is being cooled. Typically, the fluid containment vessel may be formed of any material suitable for containing and insulating a cooling fluid such as, but not limited to, metallic, plastic, ceramic, polymeric foam, composites thereof, and combinations thereof. In one aspect, the fluid containment vessel can be formed from any suitable polymeric foam. Examples of suitable polymeric foams can include, but are not limited to, polystyrene, polyurethane foams, polyolefin, polyisocyanurate, and the like.

In yet another alternative, the fluid containment vessel can be formed in a configuration that encloses or partially encloses at least a portion of a metal member. The fluid containment vessel can define an interior volume capable of retaining the cooling fluid. Typically, the interior volume can allow a sufficient volume of cooling fluid therein to directly contact the portion of the metal member to produce a desired temperature change. Furthermore, the fluid containment vessel can contain a exterior and/or interior structural casing. In one aspect the structural casing can be an aluminum alloy, such as Aluminum 5083, or stainless steel alloy, type 304.

In one embodiment the fluid containment vessel can be an insulated metal lined box. In accordance with FIG. 2, the fluid containment vessel 34 can comprise a metal lined box 26 with a removable lid 28 covered by an insulation material 24. The fluid containment vessel can have an opening 30 on opposite sides of the fluid containment vessel to allow a metal member to be placed therethrough. Additionally, the fluid containment vessel may contain optional removable fillers 22 to minimize the use of cooling fluid 32 needed to achieve the desired temperature reduction. In one embodiment, the box can be constructed from stainless steel and have an insulating polystyrene outside covering for efficient handling and use. In another embodiment, the fluid containment vessel may be a cylindrical shaped container proportioned to encase a metal member to minimize the use of cooling fluid needed to contract the metal member. For example, the cylindrical container can comprise two half-cylinders such that a channel is formed when sealed around the metal member.

Figure 2:
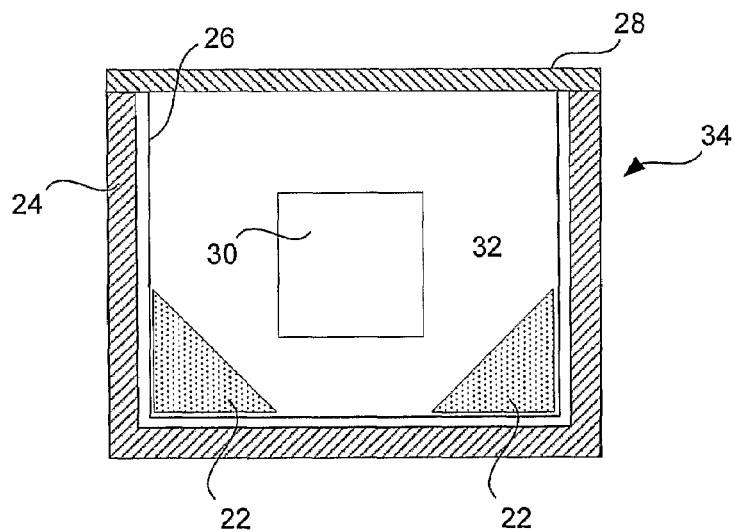
FIG. 2 is a cross-sectional view of a fluid containment vessel in accordance with an embodiment of the present invention.

The fluid containment vessel in FIG. 2 can be configured to include interchangeable inserts. The inserts can be configured on opposite sides of the fluid containment vessel in a tongue and groove or flanged fashion allowing interchangeability. The interchangeable inserts enable the fluid containment vessel to enclose and accommodate various shapes and sizes of metal members. Typically, the interchangeable inserts may be formed from any of the aforementioned polymeric foams. A polymeric foam insert may be desirable because the ease of forming the foam into any desired shape. In some aspects, multiple inserts having varying configurations can be used to conform to different metal member structures. For example, an interchangeable insert may be formed from polystyrene foam into a shape which allows for the insertion of an I-beam metal member. In another aspect, the interchangeable insert may be formed into a shape to allow for the insertion of a metal member having an S-beam structure. Alternatively, inserts can be constructed of malleable metals, rubber, foams, and/or combinations thereof. Further, multiple inserts can be used concentrically to adjust opening sizes to accommodate varying sizes of metal members. Inserts can be sealed to the metal member and cooling container with suitable caulks such as polyurethane foam, adhesives, sealants, cold-temperature gasket materials such as silicone rubber, or other known low temperature materials. Alternatively, the insert can be entirely formed of injectable foam materials which can be beneficial for on-site sealing of the fluid containment vessel.

The fluid containment vessel can be configured to enclose discrete surfaces of various members to be cooled in accordance with the present invention. The configuration of the fluid containment vessel can allow attachment to the member by clamping, bolting, or, for ferro-magnetic materials, magnetically. Sealing to the member can be accomplished by cold-temperature gasket material such as silicone rubber or other suitable low temperature materials.

In one embodiment, once the portion of the metal member has been cooled to achieve a desired linear contraction, at least one surface of the metal member can be welded to a second metal member. Welding of metal members can be accomplished through any known technique. Some of the more common processes which can be suitable include SMAW, GMAW, FCAW, and SAW. The aforementioned welding processes require an intermediate metallic filler to fuse metal objects together. In arc welding processes an arc is created between a metal work piece and an electrode. When an intermediate filler is introduced to an arc welding process, the heat of the arc melts the filler material into the work piece to fill the joint with a bead of metal. As a result, the metal members are fused or joined together. Selecting the proper welding procedure can be dictated by joint configuration and the economics needed for the joint design. There are many welding processes which may be employed by the present invention. For example, the welding process can be selected from a metal inert gas (MIG), a metal active gas (MAG), a gas tungsten arc welding (GTAW), i.e. tungsten inert gas (TIG), a plasma welder, or any other known welding apparatus. The aforementioned welding apparatuses increase the heat of the metal member, therefore when cooling a portion of a metal member, in accordance with the present invention, the cooled portion should be sufficiently remote from the welding surface such that the welded surface can be welded without detrimentally affecting the weld quality.

In accordance with the present invention, the cooled metal member may be secured and/or welded between two materials within a constrained configuration. Generally, the two materials can be fixed in position relative to one another sufficiently to achieve a reduction in tensile stresses. Thus, some flexibility is allowable; however, sufficient rigidity is also required such that during expansion of the cooled portion the final position of each joined surface of the first member do not return to their unrestrained positions. Specifically, most often, the metal member can be welded between two materials which are substantially fixed in position relative to one another. However, as a general matter, the second surface can also be secured to the second substrate using any suitable technique such as, but not limited to, bolting, brazing, interference fitting, gluing, or the like. The degree of compressive stress in the final product can be determined by the extent of contraction during cooling of the portion of the metal member.

Determining the linear expansion or compression of a given metallic material can be calculated by the following three equations. For the following equations, strain is defined by $(\epsilon)$ and displacement is defined by $(\delta)$. Stress is defined by $(\sigma)$, while length and load are defined by $(L)$ and $(P)$, respectively. Notably, $(L_{Beam})$ refers to the length of the metal member or beam and $(L_{SC})$ refers to the length of the cooled section of the metal member. In addition, $(E)$ defines Young's modulus having a value of approximately $29 \times 10^6$ psi and $(\alpha)$ refers to the coefficient of thermal expansion. Finally, $(\Delta T)$ is the change in temperature and $(A)$ defines the cross-sectional area of the cooled metal member. Using the following equations, the cooled portion length and temperature conditions necessary to mitigate the residual tensile stresses can be determined.

$$\varepsilon_{tot} = \varepsilon_{load} + \varepsilon_{temp} = \frac{\delta}{L} = \frac{\sigma}{E} + \alpha \Delta T = \frac{P}{EA} + \alpha \Delta T \quad \text{Equation 1}$$

$$\delta = \alpha \Delta T L_{SC} \quad \text{Equation 2}$$

$$\delta = \frac{P L_{Beam}}{EA} \quad \text{Equation 3}$$

Adjusting or tuning the parameters of ($L_{SC}$) and ($\Delta T$) can provide a means to achieve a desired compression stress which compensates for the tensile stress that can occur in securing a member confined between two fixed structural members. Specifically, adjusting or tuning these parameters can compensate tensile stress that inherently occurs in welding.

Once cooled, the constrained metal member can then return to ambient temperature. This can be accomplished by draining the cooling fluid or by otherwise removing the cooling source. In one embodiment, during cooling of the weld, a residual tensile stress is induced at the weld. However, as the cooled portion of the metal member is raised in temperature, the residual tensile stress at the weld joint is reduced as compressive stresses resulting from the expansion of the cooled portion build up along the metal member and at the weld. The constrained relationship of the metal member restricts expansion sufficient to introduce the compressive stress which results in at least a partial mitigation of the residual tensile welding stress at the welded joint. The same constraint can maintain a prestress on a workpiece when assembled to compensate for later service loads or restore an affected member to a desired orientation with respect to a weldment. For example, as a weld joint cools the welded structures may be pulled out of plumb, while expansion of the cooled portion can restore the structure to a desired position. Thus, in some cases mitigation of positive tensile stresses rather than compressive stress can be a result in the final structure.

The heat of welding flows out of the weld, into the surrounding cold base metal. The cooling chamber can be positioned near the weld to remove heat from the joint more quickly. Metallurgical properties of the weld can also be enhanced by controlling the rate of cooling at the weld joint.

Figure 3:
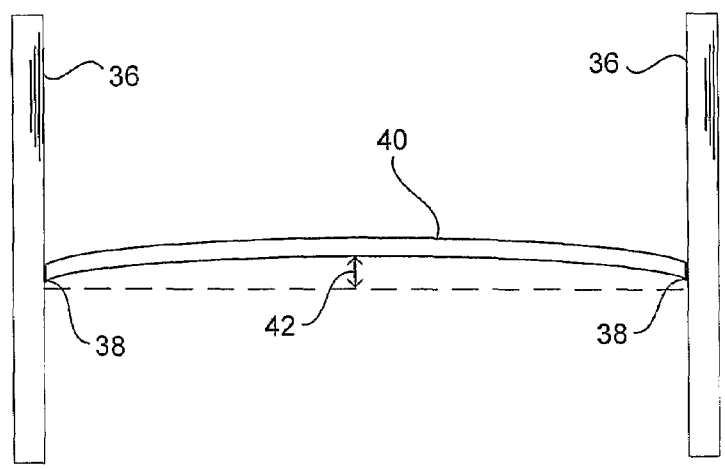
FIG. 3 is a frontal view of a cambered metal member in accordance with an embodiment of the present invention.

In one embodiment, as shown in FIG. 3, a metal member 40 can be attached to substrates 36 at joints 38 creating a camber with a displacement 42. The metal member can be contracted in accordance with the methods of the present invention such that a resultant compressive stress can be created in the metal member enough to deflect the metal member. The amount of displacement 42 can be controlled by the amount of shrinking created and the types of materials used. In one aspect, the direction of the camber can be controlled by strategically locating the cooling chamber to preferentially shrink the metal member and deflect the member in the desired direction. Thus, the camber can be created before attachment to the substrate and the metal member can be selectively contracted in order to produce a camber. For example, one or more surfaces on a side where deflection is desired to create a concave surface can be cooled while the opposite side is not directly cooled to create a cambered member. The cambered metal member 40 can then be attached to the substrates 36. Upon expansion of the metal member 40, a compressive stress can be created in the cambered metal member 40. In another aspect the invention may be applied to less restrained members to push them into their designed location correcting the distortion to assemblies that accompany welding. The present invention therefore allows for an increased control of tensile stresses associated with connecting various structural members which can lead to overall increases in yield strength, reliability, and load bearing capacity.

The following examples illustrate various methods and systems of reducing weld stresses in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Examples provide further detail in connection with several specific embodiments of the invention.

EXAMPLES

FIGS. 4-10 represent the data collected from linear variable displacement transducers during testing of the invention. FIGS. 11-14 represent temperature data collected at discrete locations along the weldment during application of the methods of the present invention. A rigid structural frame was welded in a series of test batteries to characterize residual welding stress. In each of the test batteries, a beam was welded between two rigid columns. Although the columns were rigid, some flexing was observed as shown in more detail below. Measurements were taken while one of the joints was cut out and again when the beam was cut away from the columns. Due to difficulties in gathering data in a welding environment, not all of these activities were recorded.

Figure 4:
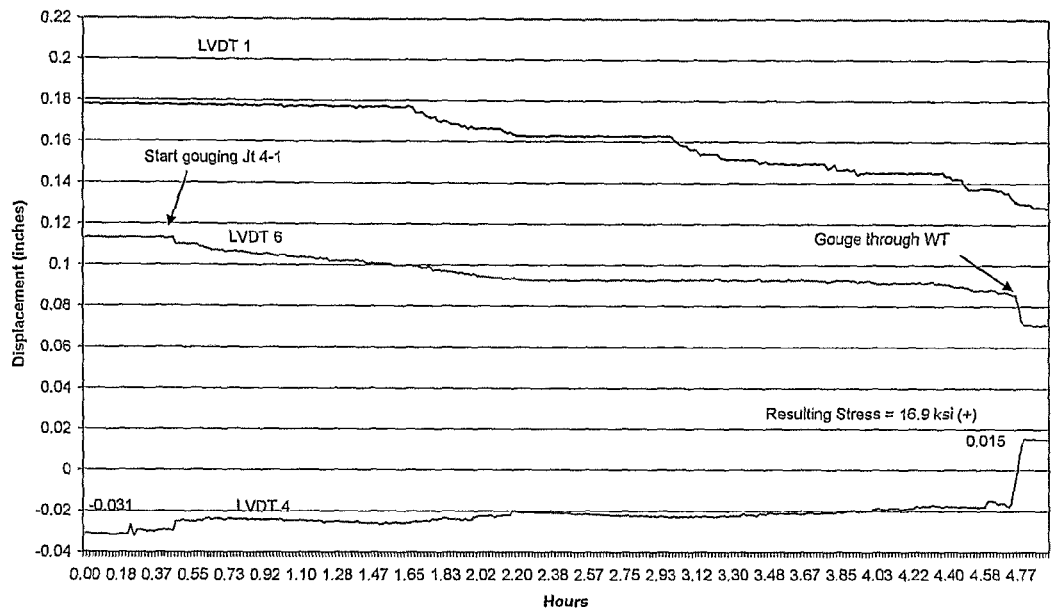
FIG. 4 is a graph of test battery 1, during the removal of Joint 4-1. The graph shows the measurements of linear variable displacement transducer 1, 4, and 6 plotted as time in hours versus displacement in inches.
Figure 5:
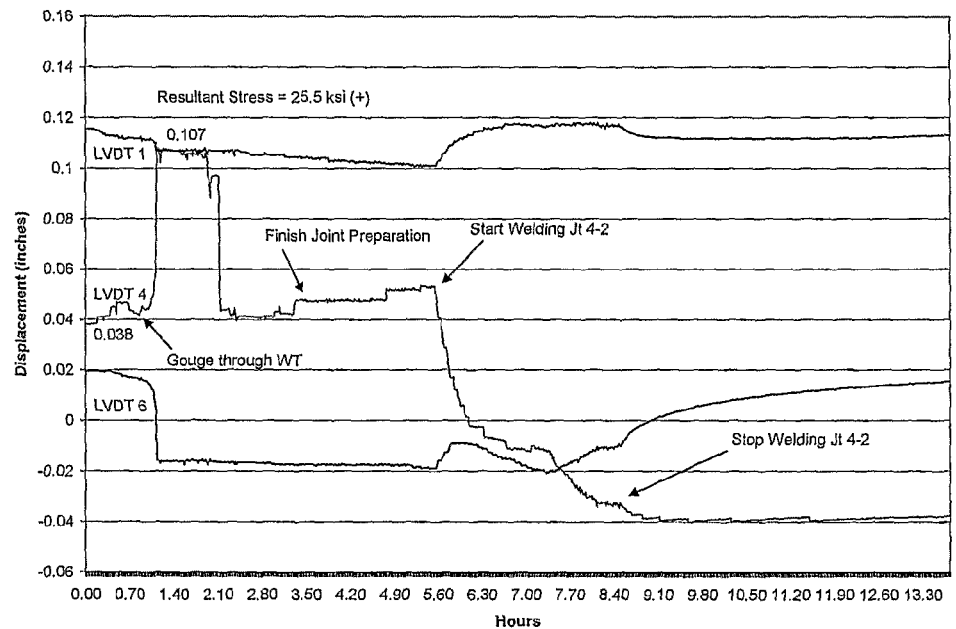
FIG. 5 is a graph of test battery 2, during the removal of weld 4-1 and the welding of joint 4-2. The graph shows the measurements of linear variable displacement transducer 1, 4, and 6 plotted as time in hours versus displacement in inches.
Figure 6:
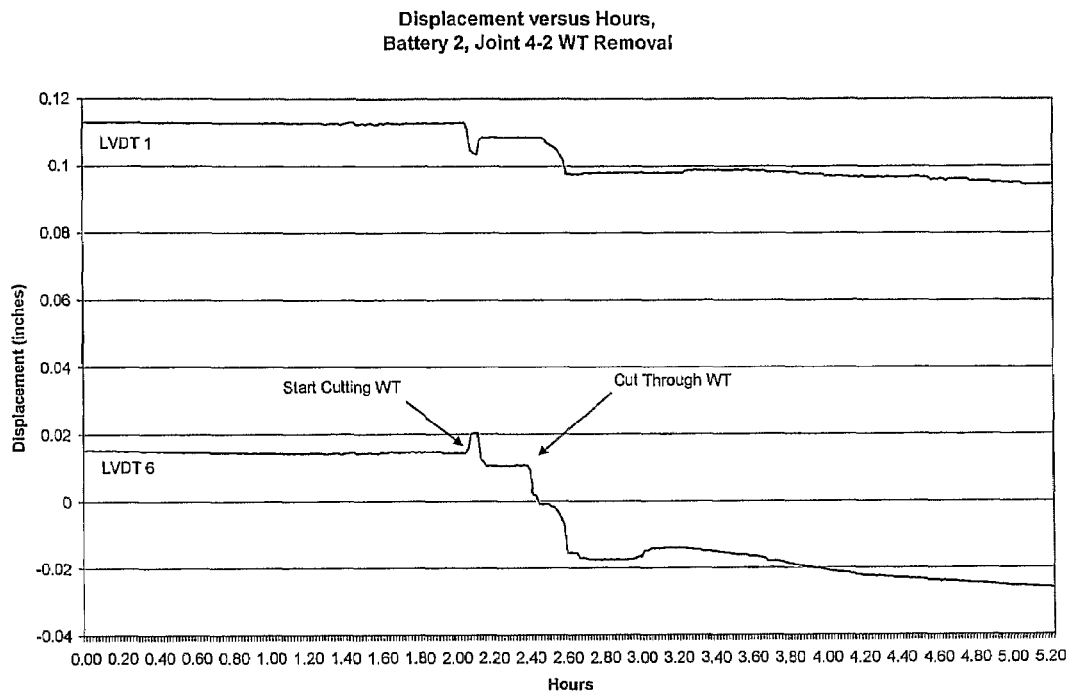
FIG. 6 is a graph of test battery 2, during the removal of Joint 4-2. The graph shows the measurements of linear variable displacement transducer 1 and 6 plotted as time in hours versus displacement in inches.
Figure 7:
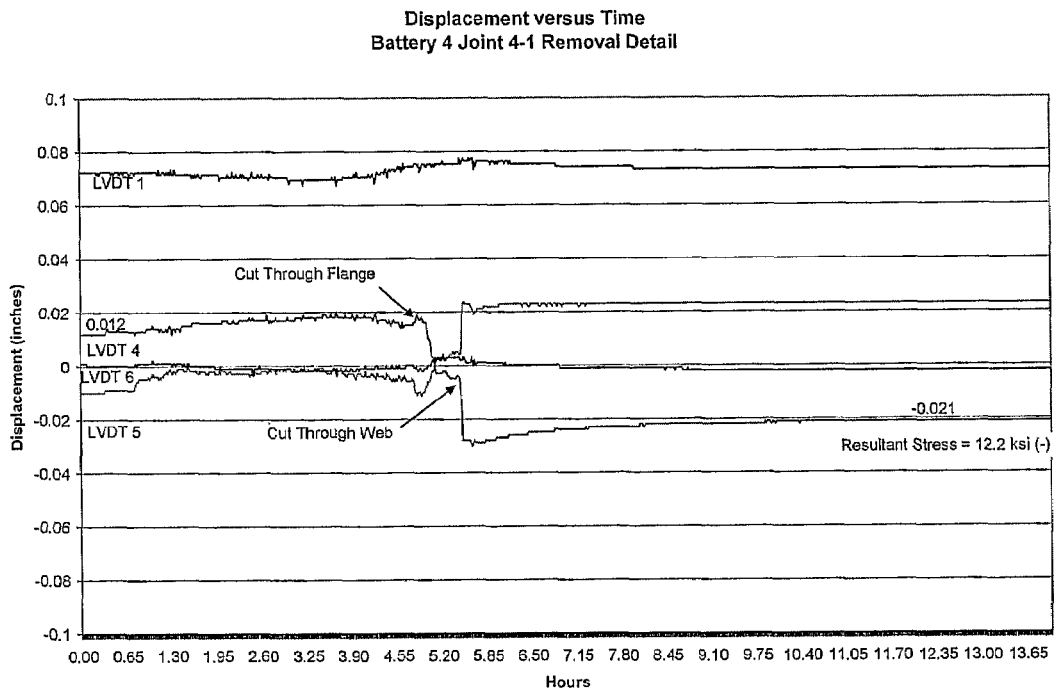
FIG. 7 is a graph of test battery 4, during the removal of Joint 4-1. The graph shows the measurements of linear variable displacement transducer 1, 4, 5, and 6 plotted as time in hours versus displacement in inches.
Figure 8:
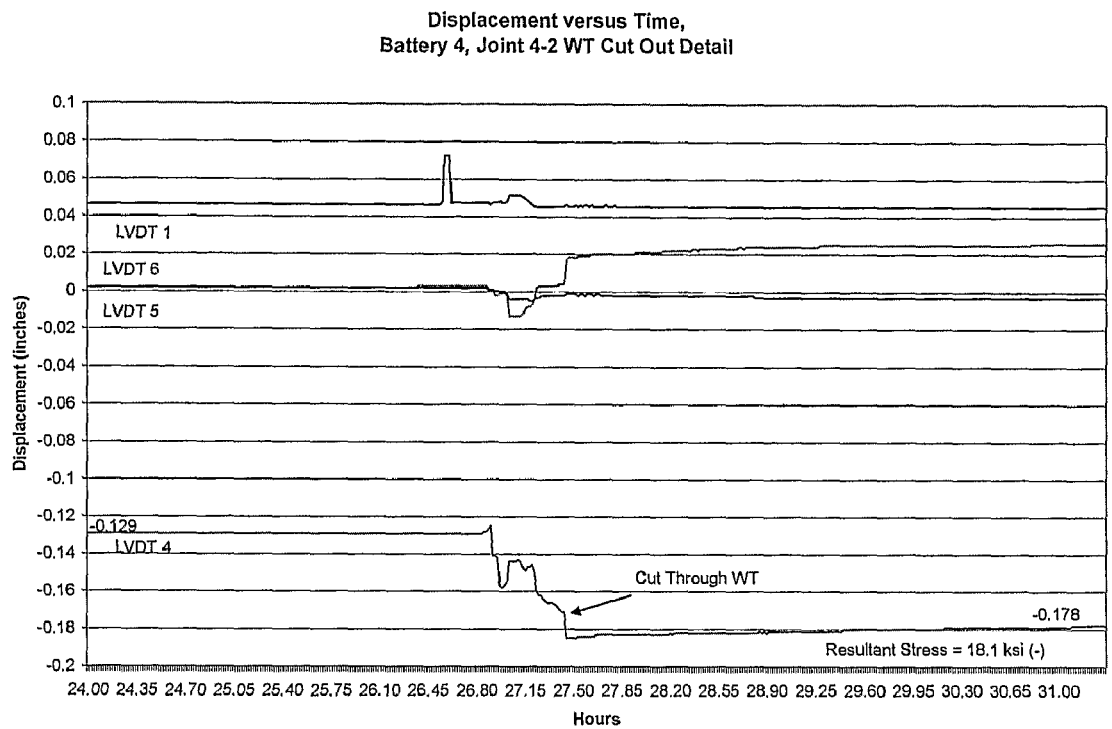
FIG. 8 is a graph of test battery 4, during the removal of Joint 4-2. The graph shows the measurements of linear variable displacement transducer 1, 4, 5, and 6 plotted as time in hours versus displacement in inches.
Figure 9:
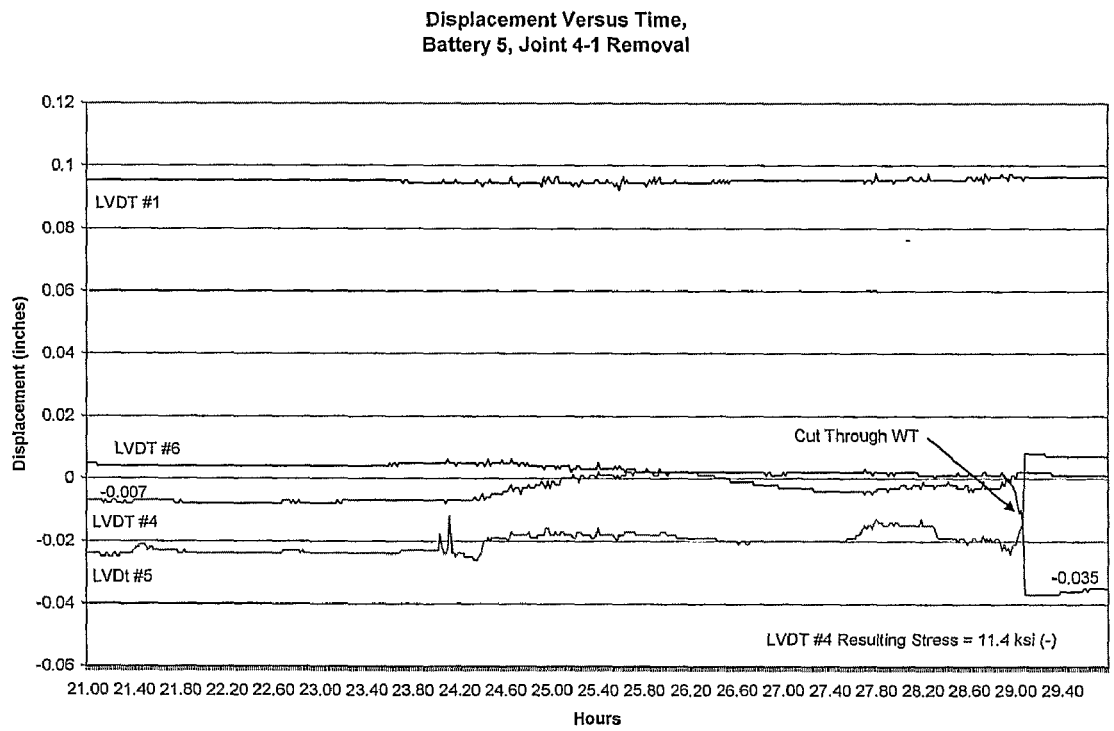
FIG. 9 is a graph of test battery 5, during the removal of Joint 4-1. The graph shows the measurements of linear variable displacement transducer 1, 4, 5, and 6 plotted as time in hours versus displacement in inches.
Figure 10:
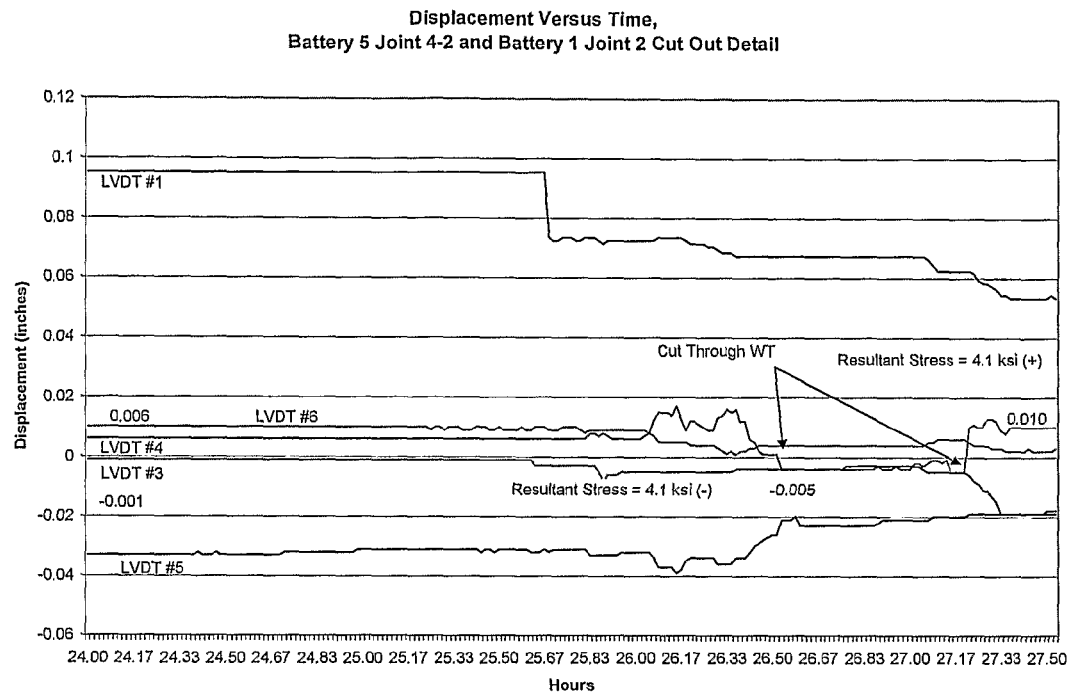
FIG. 10 is a graph of test battery 5, during the removal of Joint 4-2, and test battery 1, during removal of Joint 2. The graph shows the measurements of linear variable displacement transducer 1, 3, 4, and 5 plotted as time in hours versus displacement in inches.
Figure 11:
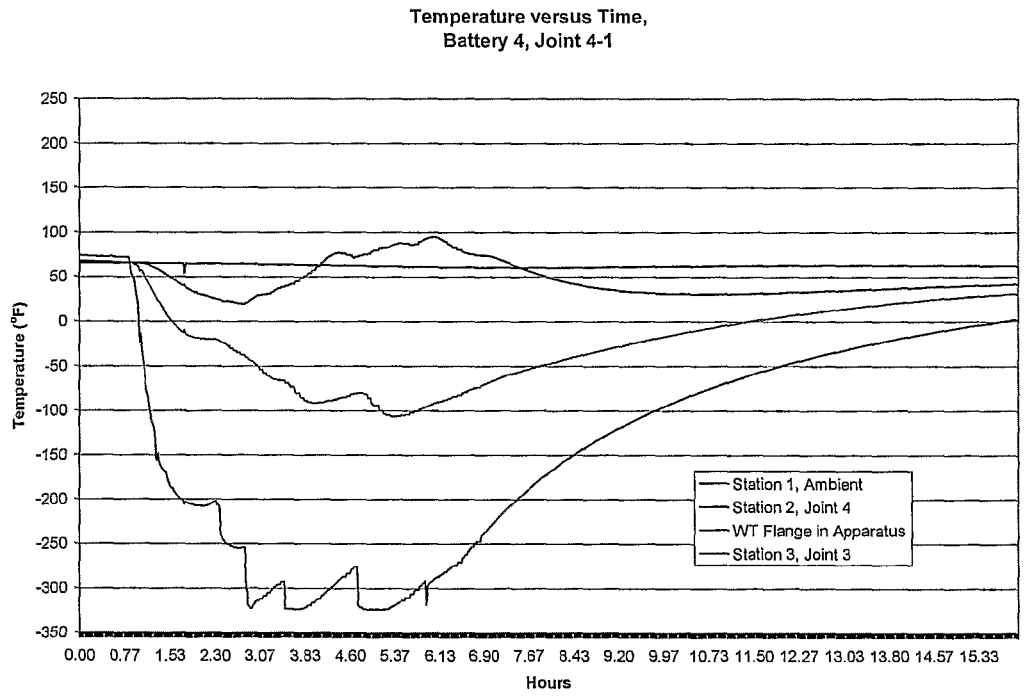
FIG. 11 is a graph of test battery 4, during the welding of Joint 4-1. The graph shows the temperature measurements of the weldment as a function of time at 4 locations: the ambient metal, joint 3, joint 4, and the metal in contact with the cooling apparatus of the present invention.
Figure 12:
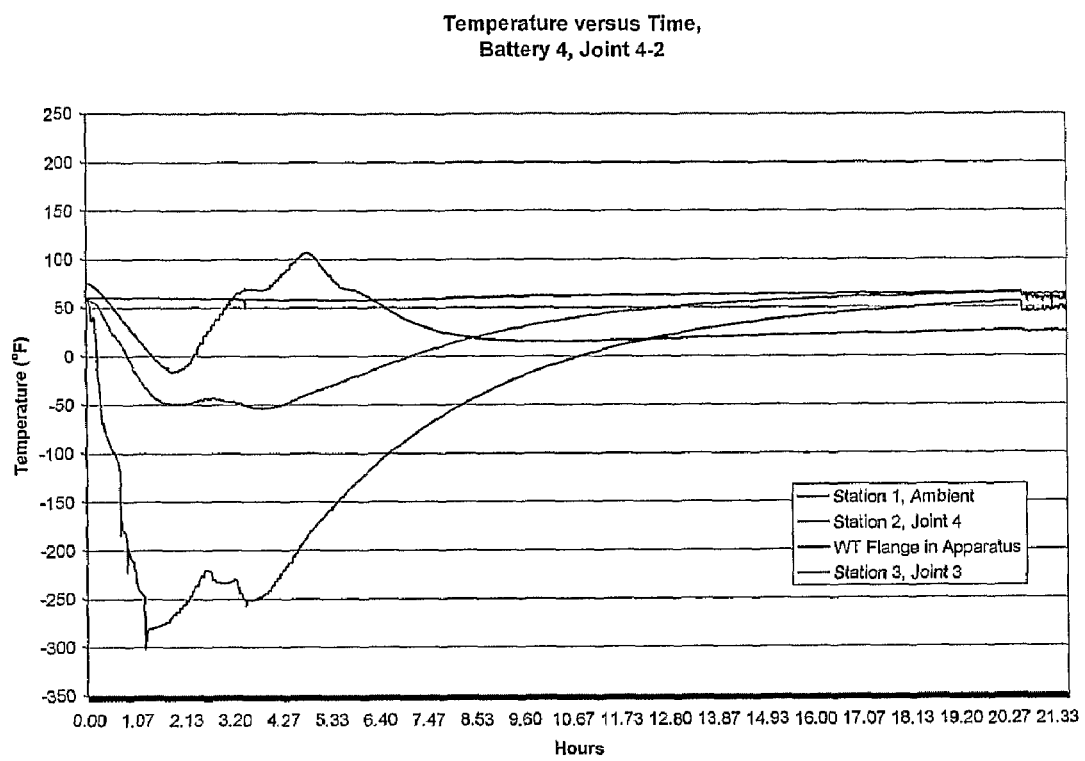
FIG. 12 is a graph of test battery 4, during the welding of Joint 4-2. The graph shows the temperature measurements of the weldment as a function of time at 4 locations: the ambient metal, joint 3, joint 4, and the metal in contact with the cooling apparatus of the present invention.
Figure 13:
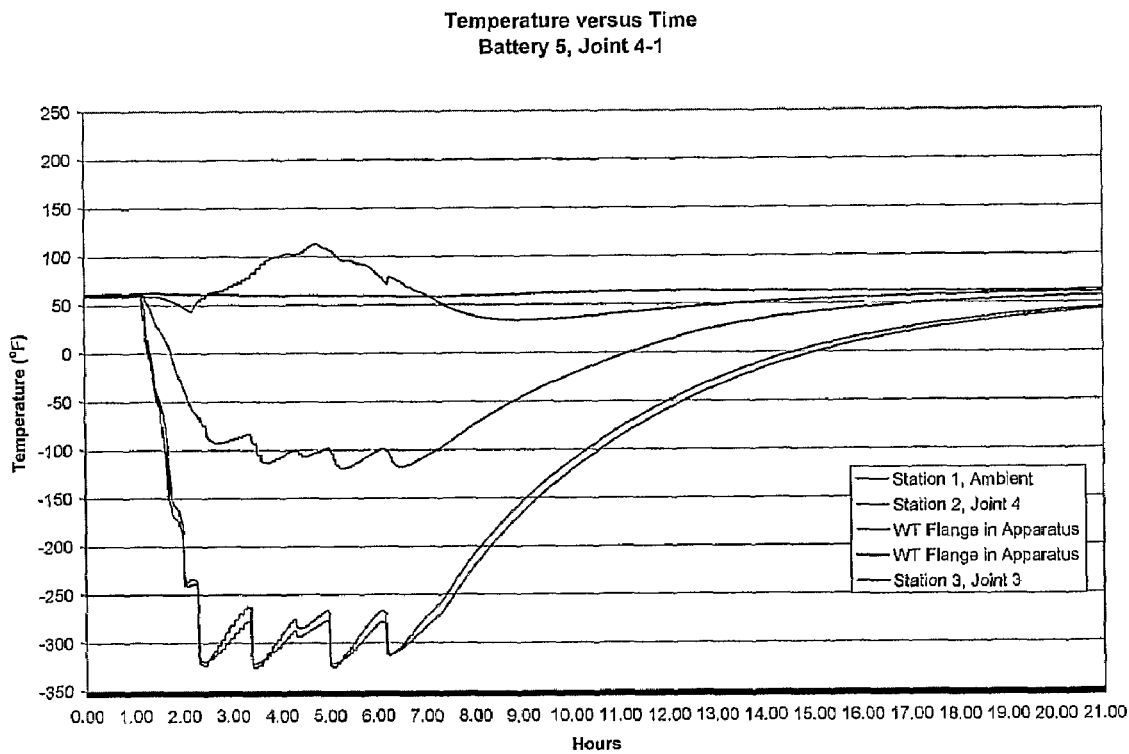
FIG. 13 is a graph of test battery 5, during the welding of Joint 4-1. The graph shows the temperature measurements of the weldment as a function of time at 4 locations: the ambient metal, joint 3, joint 4, and two different locations at the metal in contact with the cooling apparatus of the present invention, spaced 8 inches apart.
Figure 14:
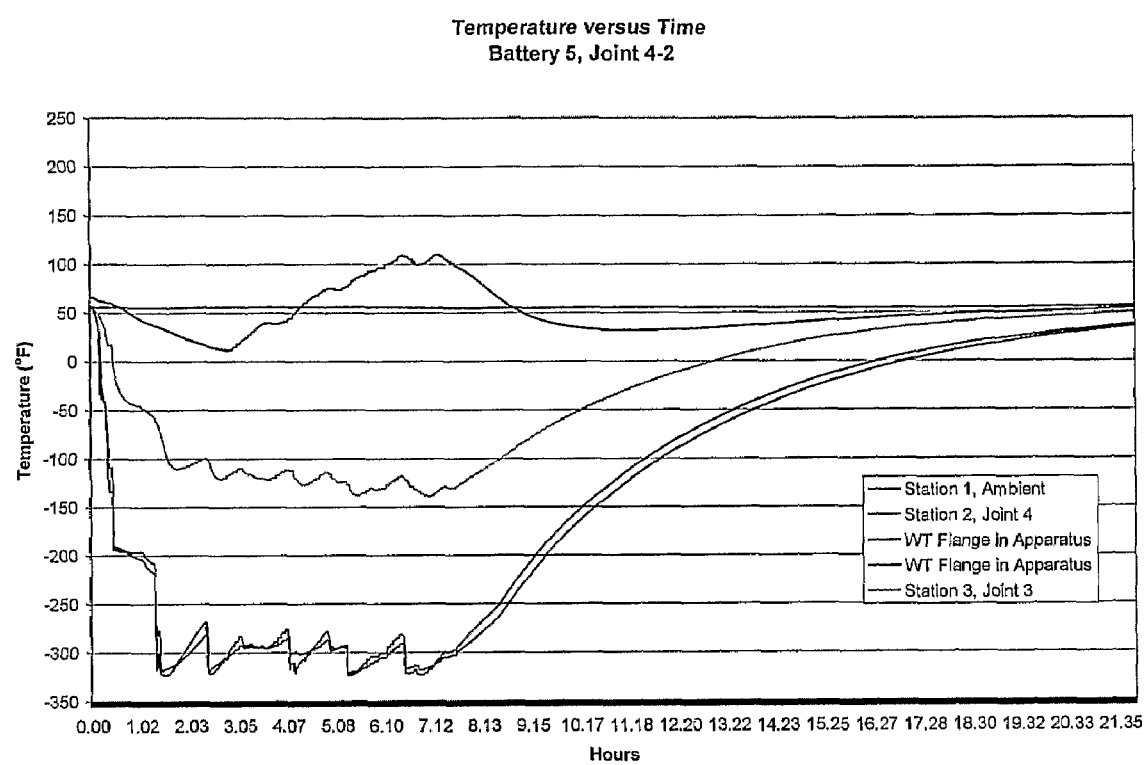
FIG. 14 is a graph of test battery 5, during the welding of Joint 4-2. The graph shows the temperature measurements of the weldment as a function of time at 5 locations: the ambient metal, joint 3, joint 4, and two different locations at the metal in contact with the cooling apparatus of the present invention, spaced 8 inches apart.

A cut made into a member under tension will expand and snap open when the member is finally severed. These responses are illustrated in Batteries 1 and 2, FIGS. 4-6, which tests do not incorporate the invention and are conventional weld joints. In FIGS. 4 and 5, LVDT #4, directly beneath the cut, shows an increase in length immediately after the cut is completed and the beam member is cut away from the column. In FIGS. 4, 5, and 6, LVDT's #1 and #6, at the exterior columns, show a decrease in length as those columns straighten out after being pulled out of plane by the residual welding stresses. This illustrates the degree of residual weld stresses which are present in conventional weldments.

A cut made into a member under compression will collapse and crush closed when the member is finally severed. These responses are illustrated in Batteries 4 and 5, as shown in FIGS. 7-10, the tests that incorporated the invention. In FIGS. 7, 8, 9 and 10, LVDT #4, directly beneath the cut, shows a decrease in length immediately after the cut is completed and the beam member is cut away from the column. The kerf created by cutting closes against itself.

The temperature of the weldment during the application of the methods of the present invention is graphed as a function of time in FIGS. 11-14. FIGS. 11-14 show the temperature of various locations including: ambient metal, joint 3, joint 4, and the cooled metal, as the welding of joint 4-1 and 4-2 were performed.

The displacement data measured by the LVDT's is used to calculate the residual welding stress in Batteries 1 and 2 or the induced compressive stress in Batteries 4 and 5 employing equation 3 above, or a variation of this equation. The measured displacement and the calculated stress in the beam member before cutting are tabulated in Table 1, below. Difficulties were encountered during the welding of Test Battery 5, joint 4-2. This joint and Joint 2 of Test Battery 1 were cut apart during the same sequence. Both results reflect the reduced displacements due to the welding difficulties.

TABLE 1

Table of Displacements and Stress

| Experiment Battery | Weld Joint & LVDT | Overall Displacement (in) | Resultant Stress (ksi) |
|---|---|---|---|
| 1 | 4-1, LVDT 4 | +0.046 | 17.0 (+) |
| 1 | 2, LVDT 3 | +0.011 | 4.1 (+) |
| 2 | 4-1, LVDT 4 | +0.069 | 25.5 (+) |
| 2 | 4-2, LVDT 6 | −0.040 | 33.3 (+) |
| 2 | 4-2, LVDT 1 | −0.018 | 30.0 (+) |
| 4 | 4-1, LVDT 4 | −0.033 | 12.2 (−) |
| 4 | 4-2, LVDT 4 | −0.049 | 18.1 (−) |
| 5 | 4-1, LVDT 4 | −0.028 | 10.3 (−) |
| 5 | 4-2, LVDT 4 | −0.010 | 3.7 (−) |

Mechanical tests were performed on the beam member used in test battery #4. These tests were compared with the results of mechanical testing performed by the producing mill as shown in Table 2.

TABLE 2

Table of Physical Properties

| Test Description and Location | Test Results, Producing Mill | Test Results, Coupon from Test Battery #4 |
|---|---|---|
| Ultimate Tensile Strength, Flange per ASTM A370 | 71,000 psi | 74,500 psi |
| Ultimate Tensile Strength, Flange per ASTM A370 | 71,000 psi | 73,500 psi |
| Yield Strength, Flange per ASTM A370 | 52,000 psi | 53,500 psi |
| Yield Strength, Flange per ASTM A370 | 52,000 psi | 50,400 psi |
| CVN, Flange per ASTM A370 | 192 ft-lbs average at 70° F. | 215 ft-lbs average at 20° F. |
| CVN, Core per ASTM A992 | Not reported | 210 ft-lbs average at 20° F. |

Testing indicates there was no reduction in the mechanical properties when the invention was employed. While the results indicate an improvement in values report by the producing mill, this difference should reflect normal variation in wrought materials rather than any improvement from interaction with the invention.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications may be made without departing from the principles and concepts set forth herein.

What is claimed is:

1. A method of mitigating residual tensile stresses in a confined assembly comprising the steps of:
    a) securing a first surface of a first member to a substrate;
    b) cooling a portion of the first member to form a cooled portion with a cooling fluid sufficient to contract said portion of the first member forming a contracted portion to at least partially mitigate residual tensile stresses upon expansion of the first member after affixing a second surface of the first member to a second structural member, wherein said portion of the first member is located between the first surface of the first member and the second surface of the first member, and wherein the contracted portion of the first metal member creates a camber before the first metal member is affixed to the second structural member; and
    c) affixing the second surface of the first member containing the cooled portion to the second structural member.

2. The method of claim 1, wherein the step of affixing is achieved by welding, bolting, soldering, riveting, or gluing.

3. The method of claim 2, wherein the step of affixing is achieved by welding.

4. The method of claim 1, wherein the cooling fluid is selected from the group consisting of liquid nitrogen, liquid helium, liquid argon, liquid oxygen, liquid carbon dioxide, and combinations thereof.

5. The method of claim 4, wherein the cooling fluid is liquid nitrogen.

6. The method of claim 1, wherein the step of cooling further comprises the step of enclosing said portion of the first member with an insulated fluid containment vessel.

7. The method of claim 6, wherein the first member comprises a weldable metal.

8. The method of claim 7, wherein the first member comprises a material selected from the group consisting of carbon steel, stainless steel, chrome-molybdenum steel, copper, titanium, aluminum, tin, iron, and alloys or composites thereof.

9. The method of claim 1, wherein the expansion of the first member is sufficient to create residual compressive stresses.

10. The method of claim 1, wherein the expansion of the first member is sufficient to create a camber in the first member.

* * * * *